US010711071B2

(12) United States Patent
Jean-Baptiste-Dit-Dominique et al.

(10) Patent No.: US 10,711,071 B2
(45) Date of Patent: Jul. 14, 2020

(54) METHOD FOR MODIFYING A NATURAL RUBBER, AND MODIFIED NATURAL RUBBER

(71) Applicant: COMPAGNIE GENERALE DES ETABLISSEMENTS MICHELIN, Clermont-Ferrand (FR)

(72) Inventors: François Jean-Baptiste-Dit-Dominique, Clermont-Ferrand (FR); Etienne Fleury, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 99 days.

(21) Appl. No.: 16/068,939

(22) PCT Filed: Jan. 10, 2017

(86) PCT No.: PCT/FR2017/050049
§ 371 (c)(1),
(2) Date: Jul. 10, 2018

(87) PCT Pub. No.: WO2017/121950
PCT Pub. Date: Jul. 20, 2017

(65) Prior Publication Data
US 2019/0048102 A1 Feb. 14, 2019

(30) Foreign Application Priority Data

Jan. 11, 2016 (FR) ...................................... 16 50182

(51) Int. Cl.
| C08C 19/06 | (2006.01) |
| C08C 19/22 | (2006.01) |
| B60C 1/00 | (2006.01) |
| C08J 3/20 | (2006.01) |

(52) U.S. Cl.
CPC ............... *C08C 19/06* (2013.01); *B60C 1/00* (2013.01); *B60C 1/0016* (2013.01); *C08C 19/22* (2013.01)

(58) Field of Classification Search
USPC ............................................. 525/333.1, 377
See application file for complete search history.

(56) References Cited

U.S. PATENT DOCUMENTS

| 4,129,538 | A | 12/1978 | Kaplan et al. |
| 6,610,261 | B1 | 8/2003 | Custodero et al. |
| 6,747,087 | B2 | 6/2004 | Custodero et al. |
| 6,774,255 | B1 | 8/2004 | Tardivat et al. |
| 6,849,754 | B2 | 2/2005 | Deschler et al. |
| 7,217,751 | B2 | 5/2007 | Durel et al. |
| 2004/0051210 | A1 | 3/2004 | Tardivat et al. |
| 2005/0016650 | A1 | 1/2005 | Durel et al. |
| 2005/0016651 | A1 | 1/2005 | Durel et al. |
| 2008/0009564 | A1 | 1/2008 | Robert et al. |
| 2008/0156404 | A1 | 7/2008 | Brunelet et al. |
| 2009/0186961 | A1 | 7/2009 | Araujo Da Silva et al. |
| 2009/0234066 | A1 | 9/2009 | Araujo Da Silva et al. |
| 2009/0292063 | A1 | 11/2009 | Robert et al. |
| 2010/0145089 | A1 | 6/2010 | Mignani |
| 2011/0054134 | A1 | 3/2011 | Seo et al. |
| 2011/0301077 | A1 | 12/2011 | Perraudin |
| 2012/0046418 | A1 | 2/2012 | Seo et al. |
| 2013/0013179 | A1 | 1/2013 | Lection et al. |
| 2013/0123418 | A1 | 5/2013 | Araujo Da Silva et al. |
| 2013/0131279 | A1 | 5/2013 | Araujo Da Silva et al. |
| 2013/0296493 | A1 | 11/2013 | Yamamoto et al. |
| 2014/0018503 | A1 | 1/2014 | Iwase et al. |
| 2014/0378619 | A1* | 12/2014 | Sakaki ................. B60C 1/0016 525/333.1 |
| 2016/0251456 | A1 | 9/2016 | Ugolnikov et al. |
| 2018/0194787 | A1 | 7/2018 | Ivanov et al. |

FOREIGN PATENT DOCUMENTS

| BR | 112013000616 A2 | 6/2016 |
| EP | 3145909 A1 | 3/2017 |
| FR | 1377363 A | 11/1964 |
| FR | 2391225 A1 | 12/1978 |
| FR | 2962737 A1 | 1/2012 |
| FR | 3033170 A1 | 9/2016 |
| FR | 3038607 A1 | 1/2017 |
| JP | 2003238016 A | 8/2003 |
| KR | 20090033559 A | 4/2009 |
| WO | 9637547 A2 | 11/1996 |
| WO | 9736724 A2 | 10/1997 |

(Continued)

OTHER PUBLICATIONS

Online English language translation of Description of WO 2015/028620 A. (Year: 2015).*
International Search Report regarding PCT/FR2017/050049 dated May 5, 2017.
Sumitra Cheawchan, et al: Catalyst-free click cascade functionalization of unsaturated-bond-containing polymers using masked-ketene-tethering nitrile N-oxide; Polymer 54 (2013) 4501-4510, Department of Organic and Polymeric Materials Tokyo Institute of Technology, 2-12-1-(H-126), Ookayama, Meguro, Tokyo 152-8552, Japan, Catalysis Research Center, Hokkaido University, N21 W10, Kita-ku, Sapporo 001-0021, Japan.

(Continued)

*Primary Examiner* — Fred M Teskin
(74) *Attorney, Agent, or Firm* — Dickinson Wright PLLC

(57) ABSTRACT

A process for modifying a natural rubber is provided. The process comprises at least the following steps:
i. providing at least one natural rubber and epoxidizing the natural rubber to obtain an epoxidized natural rubber, or providing a pre-epoxidized natural rubber,
ii. grafting, to the epoxidized natural rubber or to the pre-epoxidized natural rubber, at least one 1,3-dipolar compound having at least one nitrogen atom.

A modified natural rubber capable of being obtained by the process and also rubber compositions based on the modified natural rubber is also provided.

20 Claims, No Drawings

(56) References Cited

FOREIGN PATENT DOCUMENTS

| | | |
|---|---|---|
| WO | 9909036 A1 | 2/1999 |
| WO | 9916600 A1 | 4/1999 |
| WO | 9928380 A1 | 6/1999 |
| WO | 2005087859 A1 | 9/2005 |
| WO | 2006023815 A2 | 3/2006 |
| WO | 2006045088 A2 | 4/2006 |
| WO | 2006061064 A1 | 6/2006 |
| WO | 2006069792 A1 | 7/2006 |
| WO | 2006069793 A1 | 7/2006 |
| WO | 2006125532 A1 | 11/2006 |
| WO | 2006125533 A1 | 11/2006 |
| WO | 2006125534 A1 | 11/2006 |
| WO | 2007017060 A1 | 2/2007 |
| WO | 2007061550 A1 | 5/2007 |
| WO | 2007098080 A2 | 8/2007 |
| WO | 2008003434 A1 | 1/2008 |
| WO | 2008003435 A1 | 1/2008 |
| WO | 2008055986 A2 | 5/2008 |
| WO | 2010072685 A1 | 7/2010 |
| WO | 2012007441 A1 | 1/2012 |
| WO | 2012007442 A1 | 1/2012 |
| WO | 2012007684 A1 | 1/2012 |
| WO | 2014090756 A1 | 6/2014 |
| WO | 2015028620 A1 | 3/2015 |
| WO | 2015059269 A1 | 4/2015 |
| WO | 2015059271 A1 | 4/2015 |
| WO | 2015177104 A1 | 11/2015 |
| WO | 2017009150 A1 | 1/2017 |

OTHER PUBLICATIONS

Christoph Grundmann, et al: Nitrile Oxides. IX. Basic, Substituted, Stable Nitrile Oxides; Mellon Institute, Pittsburgh, Pennsylvania 15213, received Jan. 27, 1967, vol. 32, pp. 2308-231.

* cited by examiner

METHOD FOR MODIFYING A NATURAL RUBBER, AND MODIFIED NATURAL RUBBER

This application is a 371 national phase entry of PCT/FR2017/050049 filed on 10 Jan. 2017, which claims benefit of French Patent Application No. 1650182, filed 11 Jan. 2016, the entire contents of which are incorporated herein by reference for all purposes.

BACKGROUND

1. Technical Field

A subject of the invention is a novel process for modifying a natural rubber, a novel modified natural rubber and the use thereof in a novel rubber composition, especially for the manufacture of semi-finished products for tires or for the manufacture of tires.

2. Related Art

Since savings in fuel and the need to protect the environment have become a priority, it is desirable to produce rubber mixtures having good mechanical properties and a hysteresis which is as low as possible. This reduction in hysteresis is a permanent goal which must nonetheless be achieved while preserving the suitability for processing, in particular in the raw state, of these mixtures so as to be able to use them as rubber compositions for the manufacture of various finished or semi-finished products involved in the composition of tires, such as, for example, underlayers, sidewalls, treads, etc., and in order to obtain tires having reduced rolling resistance.

To achieve this aim, numerous solutions have already been experimented with, including especially the modification of the structure of diene copolymers and polymers. Modifying the chemical structure of a polymer generally impacts the chemical and physical properties thereof, and also the properties of the compositions containing it. This structural modification may especially be carried out by introducing chemical functions using a grafting agent. The functions introduced may, for example, improve the dispersion of the reinforcing filler in the elastomer matrix and thus make it possible to obtain a more homogeneous material. In the case of certain reinforcing fillers, such as carbon black or silica, a better dispersion of the filler will generally be reflected by a fall in hysteresis of the composition and therefore ultimately to a fall in the rolling resistance.

By way of illustration of this prior art, mention may be made of the 1,3-dipolar compounds used as grafting and functionalization agent for polymers, especially diene copolymers. Document WO-A2-2006/045088 describes, for example, 1,3-dipolar compounds enabling the grafting of oxazoline, thiazoline, alkoxysilane or allyltin functions. Document WO-A1-2012/007441 describes 1,3-dipolar compounds enabling the grafting of nitrogenous associative functions.

The grafting yields of these compounds to polymers, especially synthetic diene copolymers such as polybutadiene (BR), synthetic polyisoprene (IR), styrene/butadiene copolymer (SBR), are generally high, for example of the order of 75% to 100%.

However, this degree of grafting is not achieved when 1,3-dipolar compounds are used to modify the structure of the natural rubber (the grafting yield is lower than that obtained for synthetic rubbers). By way of example, mention is made in S. Cheawchan et al, Polymer, Vol. 54, Issue 17, 2013, pp 4501-4510 and in documents US-A1-2011/0054134 and US-A1-2012/0046418, that the degree of modification of a compound bearing nitrile oxide dipoles on a natural rubber in solution at 70° C. or 100° C. or in bulk at ambient temperature or at 70° C. reaches at most 60%, this being after 72 h of reaction.

Yet, there is a benefit to using natural rubber, especially in compositions for finished or semi-finished products for tires. Indeed, environmental concerns of recent years are strongly in favour of developing products based on raw materials of renewable origin, in order for them to as far as possible meet the needs of sustainable development by limiting supplies of raw materials derived from the petroleum industry for their manufacture.

SUMMARY

There is therefore a need to provide a process for modifying a natural rubber by a 1,3-dipolar compound comprising at least one nitrogen atom, especially at least one nitrile oxide dipole, this process making it possible to graft, with an improved yield, chemical groups capable of modifying the properties of the natural rubber, especially chemical groups enabling a good dispersion of the reinforcing filler.

One aim of the present invention is to provide a process for modifying a natural rubber and a modified natural rubber that at least partially overcome the abovementioned drawbacks.

This aim is achieved by reacting a 1,3-dipolar compound comprising at least one nitrogen atom, especially at least one nitrile oxide dipole, on a pre-epoxidized natural rubber; which, surprisingly, makes it possible to improve and especially increase the grafting yield of the 1,3-dipolar compound.

A first subject of the invention relates to a process for modifying a natural rubber, comprising at least the following steps:
i. providing at least one natural rubber and epoxidizing the natural rubber to obtain an epoxidized natural rubber, or providing a pre-epoxidized natural rubber,
ii. grafting, to the epoxidized natural rubber or to the pre-epoxidized natural rubber, at least one 1,3-dipolar compound having at least one nitrogen atom.

According to one embodiment of the invention, the step (ii) may be carried out in bulk or in solution, preferably in bulk.

According to one embodiment, the step (ii) may be carried out by heating to a temperature of greater than or equal to 70° C., preferably for at most 4 hours, preferentially for at most 2 hours and even more preferentially for at most 30 minutes.

DETAILED DESCRIPTION OF EXAMPLE EMBODIMENTS

In the present description, any interval of values denoted by the expression "between a and b" represents the range of values extending from more than "a" to less than "b" (that is to say, limits a and b excluded), whereas any interval of values denoted by the expression "from a to b" means the range of values extending from "a" up to "b" (that is to say, including the strict limits a and b).

The abbreviation "phr" (per hundred parts of rubber) means parts by weight per hundred parts of elastomers (of the total of the elastomers, if several elastomers are present) or rubber present in the rubber composition.

The term "predominantly" is understood to mean, within the meaning of embodiments of the present invention, that the compound is predominant among the compounds of the same type in the composition, that is to say that it is the one which represents the greatest amount by weight among the compounds of the same type. In other words, the weight of this compound represents at least 51% of the total weight of the compounds of the same type in the composition. By way of example, in a system comprising just one elastomer, the latter is predominant within the meaning of embodiments of the present invention and, in a system comprising two elastomers, the predominant elastomer represents more than half of the total weight of the elastomers, in other words the weight of this elastomer represents at least 51% of the total weight of the elastomers. In the same way, a "predominant" filler is that representing the greatest weight among the fillers of the composition. In other words, the weight of this filler represents at least 51% of the total weight of the fillers in the composition.

The term "heteroatom" denotes any atom other than a hydrogen atom or a carbon atom, preferably nitrogen, oxygen, silicon, sulfur or phosphorus.

The expression "$C_i$-$C_j$ alkyl" denotes a linear, branched or cyclic hydrocarbon-based radical comprising from i to j carbon atoms; i and j being integers.

The term "halogen" denotes an atom selected from the group formed of fluorine (F), chlorine (Cl), bromine (Br), iodine (I), preferably chlorine (Cl).

The expression "$C_i$-$C_j$ alkoxyl" denotes a group —OW, in which W represents a $C_i$-$C_j$ alkyl as defined above; i and j being integers.

The expression "$C_i$-$C_j$ heteroalkyl" denotes an alkyl chain comprising from i to j carbon atoms, interrupted by at least one heteroatom such as N, O or S; i and j being integers.

The expression "Ci-Cj aryl" denotes an aromatic group comprising from i to j carbon atoms; i and j being integers.

The expression "Ci-Cj alkylaryl" denotes an alkyl group attached to the remainder of the molecule by an aryl group, the sum of the carbon atoms of the alkyl group and of the aryl group being between i and j; i and j being integers.

The expression "Ci-Cj arylalkyl" denotes an aryl group attached to the remainder of the molecule by an alkyl group, the sum of the carbon atoms of the alkyl and aryl group being between i and j; i and j being integers.

The expression "Ci-Cj cycloalkyl" denotes a saturated cyclic hydrocarbon-based group having from i to j carbon atoms; i and j being integers.

The expression "Ci-Cj alkanediyl" is intended to mean, for the purposes of embodiments of the present invention, a divalent group of general formula $C_nH_{2n}$, derived from an alkane having between i and j carbon atoms. The divalent group may be linear or branched and optionally substituted.

The essential feature of the modification process of embodiments of the invention is that of using a natural rubber or a pre-epoxidized natural rubber as starting product.

According to a first embodiment of the process in accordance with the invention, the starting product is a natural rubber on which epoxidation is carried out. The natural rubber may be in solid form; it is then a dry natural rubber. The natural rubber may also be in liquid form and more specifically in latex form, that is to say in the form of particles dispersed in a liquid, in particular water. Reference is then made to natural rubber latex. Natural rubber latex may exist in various forms, as explained in detail in Chapter 3, "Latex concentrates: properties and composition", by K. F. Gaseley, A. D. T. Gordon and T. D. Pendle in "Natural Rubber Science and Technology", A. D. Roberts, Oxford University Press-20, 1988. In particular, several forms of natural rubber latex are sold: the natural rubber latices referred to as "field latices", the natural rubber latices referred to as "concentrated natural rubber latices", deproteinized latices or else prevulcanized latices. Natural rubber field latex is a latex to which ammonia has been added to avoid premature coagulation. Concentrated natural rubber latex corresponds to a field latex which has undergone a treatment corresponding to washing followed by a further concentration. The various categories of concentrated natural rubber latices are listed especially according to Standard ASTM D 1076-06. Among these concentrated natural rubber latices, a distinction is made especially between "HA" (high ammonia)-grade and "LA" (low ammonia)-grade concentrated natural rubber latices; for embodiments of the invention, use will advantageously be made of HA-grade concentrated natural rubber latices. The latex may be used directly or diluted beforehand in water to facilitate the processing thereof. Natural rubber latices may originate from Hevea, dandelion or guayule; preferably Hevea.

The epoxidation may be performed on a natural rubber latex or on a dry natural rubber. Preferentially, the epoxidation is performed on a natural rubber latex in order to form an epoxidized latex, which may especially subsequently be dried. The epoxidation of such natural rubbers is known per se. Those skilled in the art know how to adapt the epoxidation technique as a function of the type of natural rubber to be epoxidized. As examples of epoxidation techniques, mention may be made, nonlimitingly, of processes based on chlorohydrin or bromohydrin, direct oxidation processes or processes based on hydrogen peroxides, on alkyl hydroperoxides or on peracids (such as peracetic acid or performic acid).

According to a second embodiment of the process in accordance with the invention, the starting product is a pre-epoxidized natural rubber. Pre-epoxidized natural rubbers (or ENR for epoxidized natural rubber) are commercially available. As for the preceding variant, these rubbers may be obtained by epoxidation of natural rubbers, for example by processes based on chlorohydrin or bromohydrin.

Regardless of the variant used, the epoxidized natural rubber or pre-epoxidized natural rubber may have a degree of epoxidation of less than or equal to 50 mol % and preferably greater than or equal to 0.5 mol %, preferably ranging from 1 to 45 mol %, more preferably from 2 to 30 mol %.

"Degree of epoxidation", expressed as molar percentage (mol %), is intended to mean the number of moles of epoxidized cis-1,4-polyisoprene units present in the rubber polymer per 100 mol of total monomer units in this same polymer. The degree of epoxidation may be measured especially by $^1$H NMR analysis. For example, the cis-1,4-polyisoprene units, that is to say the $CH_2$—$C(CH_3)$=CH—$CH_2$ unit, and the epoxidized cis-1,4-polyisoprene units of the epoxidized natural rubber or the pre-epoxidized natural rubber are quantified by integration of the broad unresolved peaks of the signals characteristic of the protons of the CH group of the cis-1,4-polyisoprene at 5.1 ppm and the protons of the CHO group of the epoxy ring at 2.6 ppm.

The two embodiments of the modification process in accordance with the invention are equivalent, that is to say that the pre-epoxidized natural rubber is equivalent to the natural rubber that has undergone an epoxidation reaction, although they may have different advantages. In particular, the first embodiment may make it possible to obtain epoxidized natural rubbers having a different degree of epoxidation than those that are commercially available, and therefore to obtain customized degrees of epoxidation. The second embodiment of the process in accordance with the invention is advantageous when the natural rubber with the desired degree of epoxidation is commercially available, since it may thereby make it possible to reduce the number of steps in the process.

For the purposes of clarity, reference will be made in the remainder of the description to epoxidized natural rubber, regardless of whether this is a pre-epoxidized natural rubber or a natural rubber that has undergone an epoxidation reaction.

The other essential compound of the modification process of embodiments of the invention is a 1,3-dipolar compound having at least one nitrogen atom.

"1,3-dipolar compound" is intended to mean, for the purposes of embodiments of the present invention, any electrically neutral compound bearing at least one dipole, that is to say a positive charge and a negative charge in one of their main resonance structures, and capable of forming a [1,3] dipolar cycloaddition on an unsaturated carbon-carbon bond. For further details, those skilled in the art may refer to the definition given by the IUPAC (International Union of Pure And Applied Chemistry) in the glossary of class names of organic compounds and reactive intermediates based on structure (IUPAC Recommendations 1995, PAC, 1995, 67, 1307).

"1,3-dipolar compound having at least one nitrogen atom" is intended to mean, for the purposes of embodiments of the present invention, a 1,3-dipolar compound, the dipole of which comprises at least one nitrogen atom.

More particularly, the 1,3-dipolar compound having at least one nitrogen atom may comprise at least one nitrile oxide dipole, a nitrilimine dipole or a nitrone dipole.

Nitrile oxide is intended to mean, for the purposes of embodiments of the present invention, a dipole corresponding to the formula —C≡N→O, including the mesomeric forms thereof.

Nitrilimine is intended to mean, for the purposes of embodiments of the present invention, a dipole corresponding to the formula —C≡N→N, including the mesomeric forms thereof.

Nitrone is intended to mean, for the purposes of embodiments of the present invention, a dipole corresponding to the formula —C═N(→O—), including the mesomeric forms thereof.

Preferentially, the 1,3-dipolar compound having at least one nitrile oxide dipole.

According to one embodiment of the invention, the nitrile oxide dipole of the 1,3-dipolar compound may belong to a unit corresponding to the formula (I) as described below. In other words, the nitrile oxide dipole of the 1,3-dipolar compound may be attached to the remainder of the compound by an optionally substituted phenyl group, and may thus belong to a group D corresponding to the general formula (I):

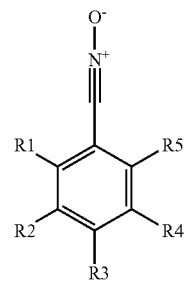

in which:
R1, R2, R3, R4, R5, which are identical or different, represent a hydrogen atom, a halogen atom, a $C_1$-$C_5$ alkyl, a $C_1$-$C_5$ alkoxyl or a covalent bond enabling attachment to the remainder of the 1,3-dipolar compound;
with the proviso that at least one of R1, R2, R3, R4, R5 represents the covalent bond.

Those skilled in the art understand that the 1,3-dipolar compound according to this embodiment and its variants is composed of the unit of formula (I) and of a remainder, also referred to as remainder of the 1,3-dipolar compound, attached to one another by the covalent bond.

More preferentially, the group D may correspond to the general formula (I), in which:
R1, R3, R5, which are identical or different, represent a hydrogen atom, a $C_1$-$C_5$ alkyl, a $C_1$-$C_5$ alkoxyl;
R2, R4 represent a hydrogen atom or a covalent bond enabling attachment to the remainder of the 1,3-dipolar compound;
with the proviso that at least one of R2 and R4 represents the covalent bond and that at least one of R1 and R5 is not a hydrogen atom.

More preferentially still, the group D may correspond to the general formula (I), in which:
R1, R3, R5, which are identical or different, represent a hydrogen atom, a methyl, an ethyl, a propyl, a methoxy, an ethoxy, a propoxy;
R2, R4 represent a hydrogen atom or a covalent bond enabling attachment to the remainder of the 1,3-dipolar compound;
with the proviso that at least one of R2 and R4 represents the covalent bond and that at least one of R1 and R5 is not a hydrogen atom.

Preferentially, the remainder of the 1,3-dipolar compound is a chemical group intended to be grafted to the epoxidized natural rubber by [3+2] cycloaddition reaction of the 1,3-dipolar compound bearing the chemical group on the double bonds of the polymer chain.

Thus, the 1,3-dipolar compound used within the context of embodiments of the invention may bear both a dipole formed of three atoms, at which charge delocalization occurs, at least one of which is a nitrogen atom, and also at least one chemical group intended to be grafted to the epoxidized natural rubber. In other words, the 1,3-dipolar compound also comprises at least one chemical group.

The chemical group may especially be any group of atoms which, once grafted to the polymer, makes it possible to modify the chemical and physical properties thereof compared to the non-grafted polymer, especially for example makes it possible to provide a good polymers-reinforcing fillers interaction when the polymer is mixed with reinforcing fillers.

Preferably, the chemical group may be a hydrocarbon-based chain that may optionally contain at least one heteroatom. For example, the hydrocarbon-based chain may be linear, cyclic and/or branched; optionally interrupted by at least one heteroatom, and/or in which at least one hydrogen atom borne by a carbon atom has been substituted by a heteroatom.

More preferentially, the chemical group may be selected from hydrocarbon-based groups, optionally substituted nitrogenous or sulfur-containing heterocycles, esters, phosphates, dialkylaminos and associative groups comprising at least one nitrogen atom.

Advantageously, the 1,3-dipolar compound may also be represented by the following formula (II):

$$G-E-D \qquad (II)$$

in which:
the symbol G represents the chemical group as defined above, including the preferred modes thereof;
the symbol D represents the group of formula (I) defined above, including the preferred modes thereof, and
the symbol E represents a spacer connecting G to D.

Preferentially, the 1,3-dipolar compound may correspond to the formula (II), in which:
the chemical group G may be selected from hydrocarbon-based groups, optionally substituted nitrogenous heterocycles, optionally substituted sulfur-containing heterocycles, esters, phosphates, dialkylaminos and associative groups comprising at least one nitrogen atom;
D and E being defined above.

Among the nitrogenous or sulfur-containing heterocycles, those comprising 5 to 6 members may be especially suitable. They may be saturated or unsaturated and optionally substituted by a $C_1$-$C_{20}$ hydrocarbon-based group. Preferably, the nitrogenous or sulfur-containing heterocycles may be selected from optionally substituted 2H-1,3-oxazoline rings, optionally substituted 2H-1,3-thiazoline rings, optionally substituted 5,6-dihydro-4H-1,3-oxazine rings, optionally substituted 5,6-dihydro-4H-1,3-thiazine rings and optionally substituted imidazole rings, the substituents being those defined above.

Among the optionally substituted imidazoles, those corresponding to the general formula (III) may be especially suitable

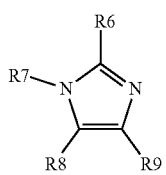

(III)

in which:
R6, R7, R8, R9, which are identical or different, represent a covalent bond which connects the imidazole ring to the spacer E, a hydrogen atom, a $C_1$-$C_{20}$ hydrocarbon-based group, or else R8 and R9 form, with the carbon atoms to which they are attached, an aryl ring, and
with the proviso that at least one of R6, R7, R8, R9 represents the covalent bond.

Preferably, the optionally substituted imidazoles may correspond to the formula (III), in which:
R6, R7, R8, R9, which are identical or different, represent a covalent bond which connects the imidazole ring to the spacer E, a hydrogen atom, a $C_1$-$C_{12}$ alkyl (preferably a $C_1$-$C_6$ alkyl) or else R8 and R9 form, with the carbon atoms to which they are attached, a benzene ring, and
with the proviso that at least one of R6, R7, R8, R9 represents the covalent bond.

Among the esters, those corresponding to the formula C(O)—O—R10, with R10 representing a $C_1$-$C_{20}$ hydrocarbon-based group, preferably a $C_1$-$C_{12}$ hydrocarbon-based group, more preferably representing a $C_1$-$C_6$ hydrocarbon-based group, may be especially suitable. Preferably, R10 is a $C_1$-$C_6$ alkyl, more preferably R10 is a methyl or an ethyl.

Among the phosphates, those corresponding to the formula —O—P(O)(OR11)(OR12), with R11 and R12, which are identical or different, representing a hydrogen atom, an alkyl, an aryl or an alkylaryl, may be especially suitable. Preferably, R11 and R12 are identical and are a $C_1$-$C_{12}$ alkyl, preferably a $C_1$-$C_6$ alkyl, preferably a methyl or an ethyl.

Among the dialkylamino groups, those corresponding to the formula —NR13R14 in which R13 and R14, which are identical or different, represent a $C_1$-$C_6$ alkyl, may be especially suitable. Mention may be made, for example, of an N,N-dimethylamino group, an N,N-diethylamino group, or an N-ethyl-N-propylamino group. Preferably, R13 and R14 are identical and are a methyl.

"Associative group" is intended to mean groups capable of associating with one another via hydrogen, ionic and/or hydrophobic bonds. According to a preferred form of the invention, they are groups capable of associating via hydrogen bonds.

When the associative groups are capable of associating via hydrogen bonds, each associative group comprises at least one donor site and one site which is accepting with regard to the hydrogen bond, so that two identical associative groups are self-complementary and can associate together with the formation of at least two hydrogen bonds. The associative groups are especially capable of associating via hydrogen bonds with functions present on any other compound, for example on reinforcing fillers, especially such as silica or carbon black.

Preferentially, the associative group comprising at least one nitrogen atom may be selected from the following formulae (IV), (V) (VI), (VII) and (VIII):

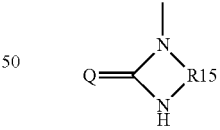

(IV)

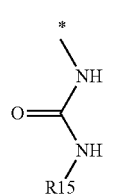

(V)

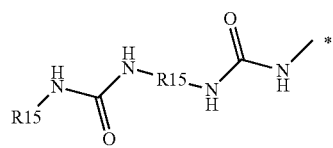

(VI)

-continued

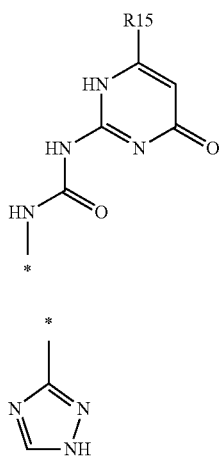

(VII)

*

(VIII)

in which:
R15 represents a hydrocarbon-based group that may optionally contain heteroatoms,
Q represents an oxygen or sulfur atom or NH, preferably an oxygen atom,
the symbol * represents an indirect attachment to the dipole of the 1,3-dipolar compound, especially to E.

Preferentially, the associative group comprising at least one nitrogen atom is a dinitrogenous or trinitrogenous, preferably dinitrogenous, heterocycle of formula (IV), containing 5 or 6 atoms, and comprising at least one carbonyl function.

The spacer E may be a covalent bond, an atom or a group of atoms, and makes it possible to connect at least one chemical group G to at least one group D. When E is a group of atoms, it may thus be any type of group of atoms known per se. The spacer E must not, or must only minimally, interfere with the dipole(s) and the chemical group(s) of the 1,3-dipolar compound intended to be grafted. The spacer may therefore be considered to be an inert group, that is to say that it does not have alkenyl or alkynyl functions that are capable of reacting with the dipole(s), nor associative groups as defined above.

The spacer E may preferably be a linear, branched, cyclic, hydrocarbon-based chain that is optionally substituted, as long as the substituents are inert with regard to the dipole(s) and the function(s) to be grafted. The hydrocarbon-based chain may comprise one or more heteroatoms. Preferably, the spacer E is a $C_1$-$C_{20}$ alkanediyl, —OR16-, —C(O)—N(H)R16-, —N(H)R16-, with R16 being a $C_1$-$C_{20}$ alkanediyl. Preferably, the spacer E may be a $C_1$-$C_6$ alkanediyl, —OR16-, —C(O)—N(H)R16-, —N(H)R16-, with R16 being a $C_1$-$C_6$ alkanediyl. As examples of $C_1$-$C_6$ alkanediyls, mention may especially be made of a methylene group —CH$_2$—, an ethylene group —CH$_2$—CH$_2$—, a propylene group —CH$_2$—CH$_2$—CH$_2$—, a butylene group —CH$_2$—CH$_2$—CH$_2$—CH$_2$—, etc.

According to a preferred embodiment of the invention, the 1,3-dipolar compound may correspond to the formula (II)

G-E-D     (II)

in which:
D corresponds to the formula (I), in which:
R1, R3, R5, which are identical or different, represent a hydrogen atom, a $C_1$-$C_5$ alkyl, a $C_1$-$C_5$ alkoxyl;
R2, R4 represent a covalent bond enabling attachment to E or a hydrogen atom;
with the proviso that at least one of R2 and R4 represents the covalent bond and that at least one of R1 and R5 is not a hydrogen atom;
G represents a hydrocarbon-based group, a 5- or 6-membered, optionally substituted, nitrogenous or sulfur-containing heterocycle, an ester, a phosphate, a dialkylamino or an associative group comprising at least one nitrogen atom,
E represents a covalent bond or an optionally substituted hydrocarbon-based chain optionally interrupted by one or more heteroatoms.

According to another preferred embodiment of the invention, the 1,3-dipolar compound may correspond to the formula (II)

G-E-D     (II)

in which:
D corresponds to the formula (I), in which:
R1, R3, R5, which are identical or different, represents a hydrogen atom, a methyl, an ethyl, a propyl, a methoxy, an ethoxy, a propoxy;
R2, R4 represent a covalent bond enabling attachment to E or a hydrogen atom; and
with the proviso that at least one of R2 and R4 represents the covalent bond and that at least one of R1 and R5 is not a hydrogen atom;
G is selected from the group formed by
hydrocarbon-based groups,
esters corresponding to the formula C(O)—O—R10, with R10 representing a $C_1$-$C_{20}$ hydrocarbon-based group, preferably a $C_1$-$C_{12}$ hydrocarbon-based group, more preferably representing a $C_1$-$C_6$ hydrocarbon-based group, even more preferably, R10 is a $C_1$-$C_6$ alkyl; better still, R10 is a methyl or an ethyl;
phosphates —O—P(O)(OR11)(OR12), with R11 and R12, which are identical or different, representing a hydrogen atom, an alkyl, an aryl or an alkylaryl; preferably, R11 and R12 are identical and are a $C_1$-$C_{12}$ alkyl, more preferentially a $C_1$-$C_6$ alkyl, even more preferably a methyl or an ethyl;
dialkylaminos NR13R14, in which R13 and R14, which are identical or different, represent a $C_1$-$C_6$ alkyl; preferably, R13 and R14 are identical and are methyl;
imidazoles of formula (III), in which R6, R7, R8, R9, which are identical or different, represent a covalent bond which connects the imidazole ring to the spacer E, a hydrogen atom, a $C_1$-$C_{12}$ alkyl (preferably a $C_1$-$C_6$ alkyl), or else R8 and R9 form, with the carbon atoms to which they are attached, a benzene ring, and with the proviso that at least one of R6, R7, R8, R9 represents the covalent bond; and
associative groups comprising at least one nitrogen atom and being selected from formulae (IV), (V), (VI), (VII) and (VIII) preferably being a dinitrogenous or trinitrogenous, preferably dinitrogenous, heterocycle of formula (IV) containing 5 or 6 atoms, and comprising at least one carbonyl function;
E represents a covalent bond or a group of atoms selected from $C_1$-$C_{20}$ alkanediyls, —OR16- groups, —C(O)—N(H)R16- groups, —N(H)R16- groups, with R16 being a $C_1$-$C_{20}$ alkanediyl, preferably with R16 being a $C_1$-$C_{10}$ alkanediyl.

According to a particular mode of the invention, the preferred 1,3-dipolar compound may especially be selected from the compounds corresponding to the following formulae (IX), (X), (XI), (XII), (XIII), (XIV), (XV), (XVI), (XVII), (XVIII), (XIX) and their mesomeric forms:

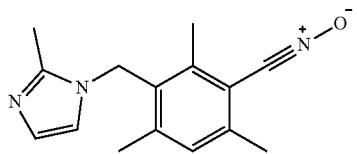
(IX)

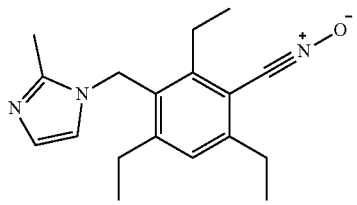
(X)

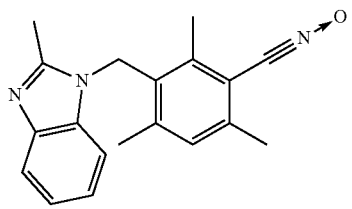
(XI)

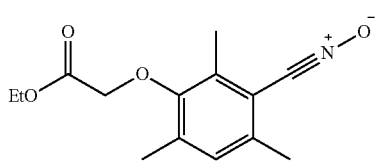
(XII)

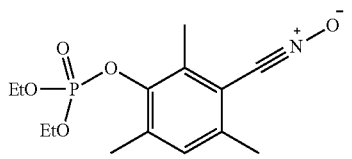
(XIII)

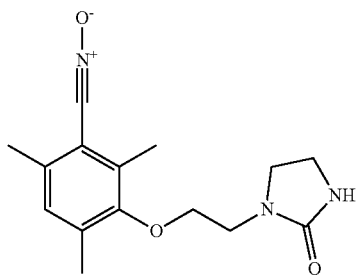 [SMILES: Cc1cc(C)c(OCCN2CCNC2=O)c(C)c1C#[N+][O-]]
(XIV)

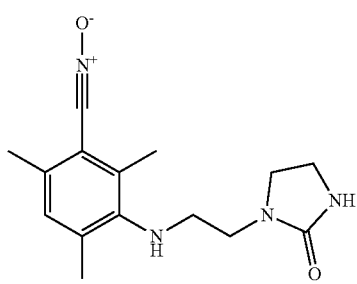
(XV)

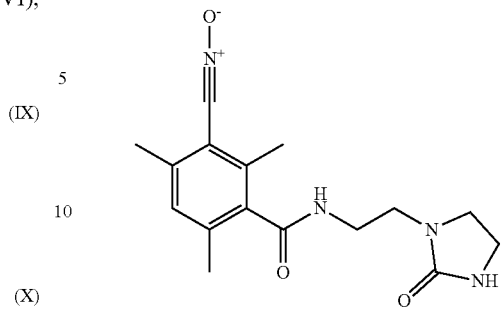
(XVI)

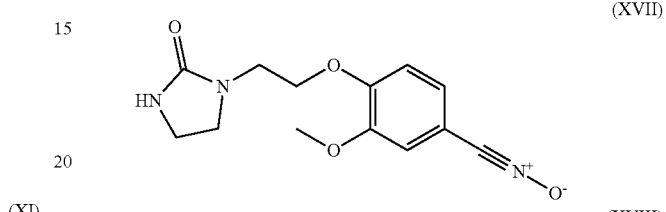
(XVII)

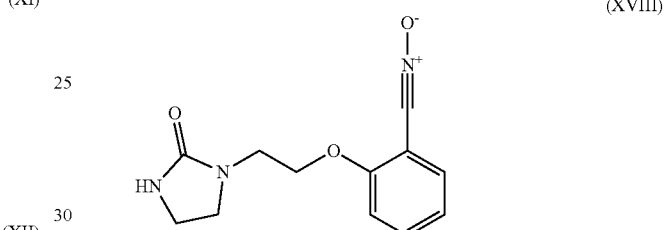
(XVIII)

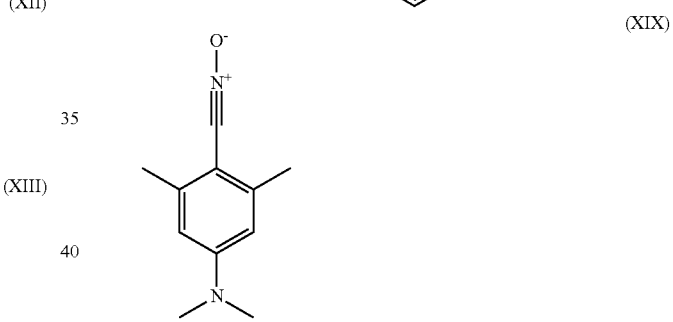
(XIX)

The more particularly preferred 1,3-dipolar compound may especially be selected from the compounds corresponding to the above formulae (IX), (X), (XI), (XII), (XIII), (XIV), (XV), (XVI), and (XIX), including the mesomeric forms thereof.

The even more particularly preferred 1,3-dipolar compound may be the compound of formula (XIV) or the compound of formula (XIX).

For the purposes of simplicity, the expression "1,3-dipolar compound" will be used in the remainder of the present description to denote the 1,3-dipolar compound having at least one nitrogen atom used in the process in accordance with embodiments of the invention, and also the preferred forms thereof.

The 1,3-dipolar compound may be synthesized by any chemical reactions well known to those skilled in the art. By way of example, reference may be made to the synthesis processes described in applications PCT/EP2015/060926, PCT/EP2015/060926, FR 15/56565, WO-A2-2006/045088, FR15/51635, WO-A1-2015/059269, WO-A1-2015/059271, WO-A1-2012/007684, WO-A1-2012/007441, WO-A1-2012/007442 and WO-A1-2014/090756.

In particular, the 1,3-dipolar compound bearing both a nitrile oxide dipole and a dialkylamino group may be obtained for example according to the procedure described in the paper in *J. Org. Chem.*, 1967, 32 (7), pp 2308-2312.

The 1,3-dipolar compound is grafted to the epoxidized natural rubber by reacting the epoxidized natural rubber with the 1,3-dipolar compound as defined above. During the reaction, the dipole of the 1,3-dipolar compound forms covalent bonds with the chain of the epoxidized natural rubber. The grafting yield is particularly high, preferentially greater than 60%. "Grafting yield" or "yield" is intended to mean the content, as molar percentage, of 1,3-dipolar compound grafted to the chain of the epoxidized natural rubber, relative to the content, in molar percentage, of 1,3-dipolar compound introduced as starting reagent.

"Molar content of the 1,3-dipolar compound" is intended to mean the number of moles of 1,3-dipolar compound used per 100 units of epoxidized natural rubber, that is to say per hundred monomer units of epoxidized natural rubber (isoprene monomer unit and epoxidized isoprene monomer unit). For example, if the content of 1,3-dipolar compound is 1 mol % for an epoxidized natural rubber containing 50% epoxide, this means that there is 1 mol of 1,3-dipolar compound per 100 isoprene units, whether epoxidized or not.

The 1,3-dipolar compound is grafted by [3+2] cycloaddition of the dipole of the 1,3-dipolar compound to an unsaturation, especially a carbon-carbon double bond, of the chain of the epoxidized natural rubber. The cycloaddition mechanism may be illustrated by the following generic reaction schemes:

Cycloaddition of a nitrile oxide to an unsaturation or double bond of the polymer (in this instance an isoprene unit)

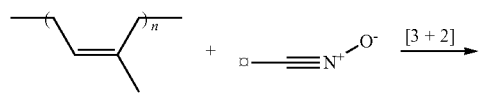

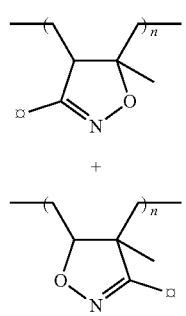

Cycloaddition of a nitrone to an unsaturation or double bond of the polymer (in this instance an isoprene unit)

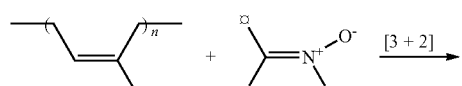

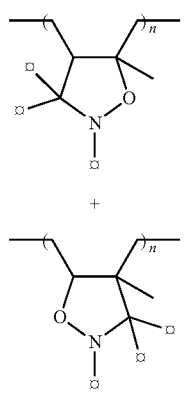

Cycloaddition of a nitrilimine to an unsaturation or double bond of the polymer (in this instance an isoprene unit)

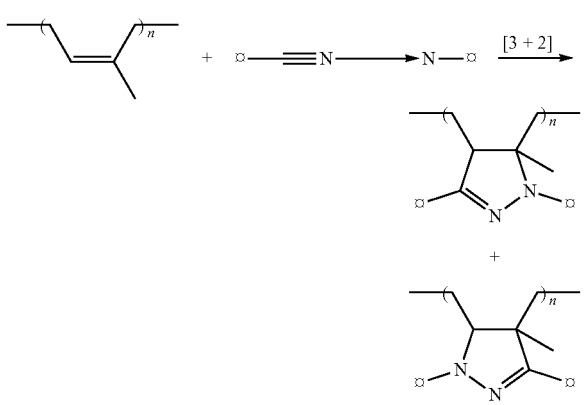

The grafting of the 1,3-dipolar compound may be carried out in bulk, for example in an internal mixer or an external mixer, such as an open mill. It may also be carried out in solution, continuously or batchwise. The modified natural rubber may be separated from its solution by any type of means known to those skilled in the art and in particular by a steam stripping operation.

According to one embodiment, the grafting reaction may be carried out by heating the reaction mixture to a temperature of greater than or equal to 70° C., preferably for at most 4 hours, preferentially for at most 2 hours and even more preferentially for at most 30 minutes.

According to one embodiment of the invention, the content (as molar percentage (mol %)) of the 1,3-dipolar compound may range from 0.1 to 10 mol %, preferably from 0.1 to 5 mol %.

Another subject of the present invention relates to a modified natural rubber capable of being obtained, especially being obtained, according to any one of the embodiments of the modification process, including the preferred modes thereof.

This modified natural rubber may comprise, distributed randomly within the chain, cis-1,4-isoprene units, epoxidized cis-1,4-isoprene units, and units resulting from the [3+2] cycloaddition of at least one 1,3-dipolar compound as defined above.

The modified natural rubber of embodiments of the invention is particularly suited to being used in reinforced rubber compositions intended for the manufacture of semi-finished and finished products such as tires. Indeed, the presence on the elastomer of epoxy rings and of chemical groups, especially of chemical groups capable of interacting with a reinforcing filler, improves the performance properties of the tire, especially the grip and rolling resistance performance properties.

Thus, another subject of the present invention relates to a rubber composition based on:
- at least one modified natural rubber capable of being obtained, or obtained, by the process described above, regardless of the variant of the process implemented,
- at least one reinforcing filler, and
- at least one crosslinking system.

"Rubber composition based on" should be understood as meaning a rubber composition comprising the mixture and/or the reaction product of the various constituents used, some of these base constituents being capable of reacting or intended to react with one another, at least in part, during the various phases of manufacture of the composition, in particular during the crosslinking or vulcanization thereof.

The modified natural rubber may be composed, according to embodiments of the invention, of a mixture of several modified natural rubbers in accordance with embodiments of the invention.

According to one embodiment of the invention, the rubber composition may also, besides the modified natural rubber, comprise at least one other diene elastomer. This or these other diene elastomer(s) may thus be present in the composition in proportions of between 0 and 60 phr (the limit values of this range being excluded), preferentially at most 49 phr, and even more preferentially at most 30 phr.

According to one embodiment of the invention, the fraction by weight of the modified natural rubber in the composition may be predominant. In other words, the modified natural rubber may represent at least 51% of the total weight of all the elastomers present in the composition. Preferably, the content of modified natural rubber may be at least 51 phr, in particular at least 70 phr.

According to another embodiment of the invention, the content of modified natural rubber may range from 51 phr to 100 phr; preferably, this content may be equal to 100 phr.

"Diene elastomer" must be understood according to embodiments of the invention to mean any elastomer of synthetic origin composed at least in part (that is to say a homopolymer or a copolymer) of diene monomer(s) (i.e. monomer(s) bearing two conjugated or non-conjugated carbon-carbon double bonds).

These diene elastomers can be classified into two categories: "essentially unsaturated" or "essentially saturated". "Essentially unsaturated" is generally intended to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be termed "essentially saturated" diene elastomers (low or very low content, always less than 15%, of units of diene origin). In the category of "essentially unsaturated" diene elastomers, "highly unsaturated" diene elastomer is intended in particular to mean a diene elastomer having a content of units of diene origin (conjugated dienes) which is greater than 50%.

Given these definitions, "diene elastomer capable of being used in the compositions in accordance with embodiments of the invention" is intended more particularly to mean:

(a)—any homopolymer of a conjugated diene monomer, especially any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, those skilled in the art of tires will understand that embodiments of the present invention is preferably employed with essentially unsaturated diene elastomers, in particular of the above type (a) or (b).

In the case of copolymers of type (b), they contain from 20% to 99% by weight of diene units, and from 1 to 80% by weight of vinylaromatic units.

As conjugated dienes, the following are especially suitable: 1,3-butadiene, 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, or 2,4-hexadiene.

As vinylaromatic compounds, the following are suitable, for example: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

Preferentially, the diene elastomer may be selected from the group of highly unsaturated diene elastomers consisting of polybutadienes (BR), butadiene copolymers, polyisoprenes (PI), isoprene copolymers and the mixtures of these elastomers. Such copolymers may more preferentially be selected from the group consisting of copolymers of butadiene and of a vinylaromatic monomer, more particularly the butadiene/styrene copolymer (SBR), isoprene/butadiene copolymers (BIR), copolymers of isoprene and of a vinylaromatic monomer, more particularly the isoprene/styrene copolymer (SIR), and isoprene/butadiene/styrene copolymers (SBIR). Among these copolymers, copolymers of butadiene and of a vinylaromatic monomer, more particularly the butadiene/styrene copolymer (SBR), are particularly preferred.

These diene elastomers can have any microstructure, which depends on the polymerization conditions used, especially on the presence or absence of a modifying and/or randomizing agent and on the amounts of modifying and/or randomizing agent employed. The diene elastomers may, for example, be block, random, sequential or microsequential elastomers and be prepared in dispersion or in solution.

The diene elastomer may be star-branched, coupled, functionalized or non-functionalized, in a way known per se, by means of functionalization agents, coupling agents or star-branching agents known to those skilled in the art.

The rubber composition in accordance with embodiments of the invention comprises at least one reinforcing filler, for example carbon black or a reinforcing inorganic filler such as silica, with which a coupling agent is combined in a known way, or else a mixture of these two types of filler.

All carbon blacks, used individually or in the form of mixtures, especially blacks of the HAF, ISAF or SAF type, conventionally used in tires ("tire-grade" blacks) are suitable as carbon blacks. Use may also be made, according to the applications targeted, of blacks of higher series FF, FEF, GPF or SRF. The carbon blacks could, for example, be already incorporated in the diene elastomer in the form of a masterbatch, before or after grafting and preferably after grafting (see, for example, applications WO-A2-97/36724 or 1).

"Reinforcing inorganic filler" should be understood here as meaning any inorganic or mineral filler, regardless of its colour and its origin (natural or synthetic), also known as "white filler", "clear filler" or even "non-black filler", in contrast to carbon black; this inorganic filler being capable of reinforcing by itself alone, without means other than an intermediate coupling agent, a rubber composition intended for the manufacture of tires, in other words capable of replacing, in its reinforcing role, a conventional tire-grade carbon black. Such a filler is generally characterized, in a known way, by the presence of hydroxyl (—OH) groups at its surface, requiring, in order to be used as reinforcing filler, the use of a coupling agent or system intended to provide a stable chemical bond the filler and the elastomer matrix.

Mineral fillers of the siliceous type, such as silica, are especially suitable as reinforcing inorganic fillers. The silica used can be any reinforcing silica known to those skilled in the art, especially any precipitated or fumed silica exhibiting a BET surface area and also a CTAB specific surface area both of less than 450 $m^2/g$, preferably from 30 to 400 $m^2/g$, especially between 60 and 300 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas and also the Zeosil Premium 200 silica from Solvay, the Hi-Sil EZ150G silica from PPG, the Zeopol 8715, 8745 and 8755 silicas from Huber or the silicas with a high specific surface area as described in application WO-A1-03/016387.

In the present account, the BET specific surface area is determined in a known way by gas adsorption using the Brunauer-Emmett-Teller method described in The Journal of the American Chemical Society, Vol. 60, page 309, February 1938, more specifically according to French Standard NF ISO 9277 of December 1996 (volumetric (5 point) method—gas: nitrogen—degassing: 1 hour at 160° C.—relative pressure p/po range: 0.05 to 0.17). The CTAB specific surface area is the external surface area determined according to French Standard NF T45-007 of November 1987 (method B).

Of course, the term "reinforcing inorganic filler" is also understood to mean mixtures of various reinforcing inorganic fillers, in particular of highly dispersible silicas as described above or a mixture of inorganic fillers of siliceous type and of non-siliceous inorganic fillers. As non-siliceous inorganic fillers, mention may be made of mineral fillers of the aluminous type, in particular alumina ($Al_2O_3$) or aluminium (oxide)hydroxides, or else reinforcing titanium oxides, for example described in U.S. Pat. Nos. 6,610,261 and 6,747,087. The non-siliceous inorganic fillers, when present, are in a minor amount in the reinforcing filler.

The physical state in which the reinforcing filler is provided is not important, whether it is in the form of a powder, of microbeads, of granules, of beads or any other appropriate densified form. Of course, reinforcing filler is also understood to mean mixtures of different reinforcing fillers, in particular of highly dispersible siliceous and/or aluminous fillers as described below.

Those skilled in the art will understand that use might be made, as filler equivalent to the reinforcing inorganic filler described in the present section, of a reinforcing filler of another nature, especially organic, such as carbon black, provided that this reinforcing filler is covered with an inorganic layer, such as silica, or else comprises, at its surface, functional sites, especially hydroxyl sites, requiring the use of a coupling agent in order to establish the bond between the filler and the elastomer. By way of example, mention may be made, for example, of carbon blacks for tires, such as described, for example, in patent documents WO-A2-96/37547 and WO-A1-99/28380.

According to one embodiment of the invention, the reinforcing filler may predominantly consist of carbon black; preferably, it may comprise at least 51% by weight of carbon black relative to the total weight of the reinforcing filler. Preferentially, the reinforcing filler may consist to 100% by weight of carbon black, relative to the total weight of the reinforcing filler.

If the reinforcing filler comprises less than 100% by weight of carbon black relative to the total weight of the reinforcing filler, the filler remainder is provided by at least one other reinforcing filler, especially a reinforcing inorganic filler such as silica.

According to another embodiment of the invention, the reinforcing filler may be predominantly a reinforcing inorganic filler, that is to say a reinforcing filler other than carbon black. It may preferentially comprise more than 51% by weight, relative to the total weight of the reinforcing filler, of one or more reinforcing inorganic filler(s), especially a reinforcing inorganic filler such as silica. Preferentially, the reinforcing filler may exclusively consist of a reinforcing inorganic filler, especially exclusively consist of silica. In other words, the reinforcing filler may consist to 100% by weight, relative to the total weight of the reinforcing filler, of a reinforcing inorganic filler such as silica.

If the reinforcing filler comprises less than 100% by weight of reinforcing inorganic filler relative to the total weight of the reinforcing filler, the filler remainder is provided by at least one other reinforcing filler, such as, for example, carbon black. According to this variant, when carbon black is present, it may be used in the composition at a content of less than 20 phr, more preferentially of less than 10 phr (for example may range from 0.5 to 20 phr, especially may range from 2 to 10 phr).

Preferentially, the content of total reinforcing filler (that is to say, depending on the variants, the content of carbon black, the content of reinforcing inorganic filler such as silica, or the content of carbon black and of reinforcing inorganic filler such as silica) may range from 30 to 200 phr, more preferentially from 40 to 150 phr. Those skilled in the art know how to adapt this content of total reinforcing filler in the composition as a function of the different particular applications targeted.

The rubber compositions in accordance with embodiments of the invention can also contain reinforcing organic fillers which can replace all or a portion of the carbon blacks or of the other reinforcing inorganic fillers described above. Mention may be made, as examples of reinforcing organic fillers, of functionalized polyvinyl organic fillers, such as described in Applications WO-A1-2006/069792, WO-A1-2006/069793, WO-A1-2008/003434 and WO-A1-2008/003435.

When the reinforcing filler comprises a filler requiring the use of a coupling agent in order to establish the bond between the filler and the modified natural rubber, and between the filler and the other diene elastomer, when present, the rubber composition according to embodiments of the invention may also conventionally comprise an agent capable of effectively providing this bond. When silica is present in the composition as reinforcing filler, use is made, in a known manner, of an at least bifunctional coupling agent (or bonding agent) intended to provide a sufficient connection, of chemical and/or physical nature, between the inorganic filler (surface of its particles) and the modified natural rubber, and between the filler and the other diene elastomer, when present, in particular bifunctional polyorganosiloxanes or organosilanes.

As coupling agent, mention may especially be made of silane polysulfides, referred to as "symmetrical" or "asymmetrical" depending on their specific structure, such as described, for example, in Applications WO-A1-03/002648 (or US-A1-2005/016651) and WO-A1-03/002649 (or US-A1-2005/016650).

Suitable in particular, without the definition below being limiting, are silane polysulfides corresponding to the following general formula (XX):

Z-A-S$_x$-A-Z        (XX)

in which:
  x is an integer from 2 to 8 (preferably from 2 to 5);
  the A symbols, which are identical or different, represent a divalent hydrocarbon-based radical (preferably a C$_1$-C$_{18}$ alkylene group or a C$_6$-C$_{12}$ arylene group, more particularly a C$_1$-C$_{10}$, especially C$_1$-C$_4$, alkylene, in particular propylene);
  the Z symbols, which are identical or different, correspond to one of the three formulae below:

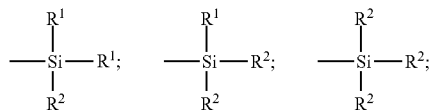

in which:
    the R$^1$ radicals, which are substituted or unsubstituted and identical to or different from one another, represent a C$_1$-C$_{18}$ alkyl group, C$_5$-C$_{18}$ cycloalkyl group or C$_6$-C$_{18}$ aryl group (preferably C$_1$-C$_6$ alkyl, cyclohexyl or phenyl groups, especially C$_1$-C$_4$ alkyl groups, more particularly methyl and/or ethyl).
    the R$^2$ radicals, which are substituted or unsubstituted and identical to or different from one another, represent a C$_1$-C$_{18}$ alkoxyl group or C$_5$-C$_{18}$ cycloalkoxyl group (preferably a group selected from C$_1$-C$_8$ alkoxyls and C$_5$-C$_8$ cycloalkoxyls, more preferentially still a group selected from C$_1$-C$_4$ alkoxyls, in particular methoxyl and ethoxyl).

In the case of a mixture of alkoxysilane polysulfides corresponding to the above formula (XX), especially normal commercially available mixtures, the mean value of the "x" indices is a fractional number preferably of between 2 and 5, more preferably of approximately 4. However, embodiments of the invention can also advantageously be carried out, for example, with alkoxysilane disulfides (x=2).

Mention will more particularly be made, as examples of silane polysulfides, of bis((C$_1$-C$_4$)alkoxyl(C$_1$-C$_4$)alkylsilyl (C$_1$-C$_4$)alkyl) polysulfides (especially disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula [(C$_2$H$_5$O)$_3$Si(CH$_2$)$_3$S$_2$]$_2$, or bis(3-triethoxysilylpropyl) disulfide, abbreviated to TESPD, of formula [(C$_2$H$_5$O)$_3$Si(CH$_2$)$_3$S]$_2$. Mention will also be made, as preferential examples, of bis(mono(C$_1$-C$_4$)alkoxyldi(C$_1$-C$_4$)alkylsilylpropyl) polysulfides (especially disulfides, trisulfides or tetrasulfides), more particularly bis(monoethoxydimethylsilylpropyl) tetrasulfide, such as described in the aforementioned patent application WO-A1-02/083782 (or U.S. Pat. No. 7,217,751).

As examples of coupling agents other than an alkoxysilane polysulfide, mention will especially be made of bifunctional POSs (polyorganosiloxanes) or else hydroxysilane polysulfides (R$^2$=OH in the above formula (XX)) as described, for example, in patent applications WO-A1-02/30939 (or U.S. Pat. No. 6,774,255), WO-A1-02/31041 (or US-A1-2004/051210), and WO-A1-2007/061550, or else silanes or POSs bearing azodicarbonyl functions, such as described, for example, in patent applications WO-A1-2006/125532, WO-A1-2006/125533, WO-A1-2006/125534.

As examples of other silane sulfides, mention will be made, for example, of silanes bearing at least one thiol (—SH) function (referred to as mercaptosilanes) and/or at least one masked thiol function, such as described, for example, in patents or patent applications U.S. Pat. No. 6,849,754, WO-A1-99/09036, WO-A2-2006/023815, WO-A2-2007/098080, WO-A1-2010/072685 and WO-A2-2008/055986.

Of course, use might also be made of mixtures of the coupling agents described above, as described especially in the abovementioned application WO-A1-2006/125534.

The content of coupling agent may advantageously be less than 20 phr, it being understood that it is generally desirable to use as little as possible of it. Typically, the content of coupling agent may represent from 0.5% to 15% by weight relative to the amount of inorganic filler. Its content may preferentially range from 0.5 to 12 phr, more preferably may be within a range extending from 3 to 10 phr. This content may be readily adjusted by those skilled in the art depending on the content of inorganic filler used in the composition. These preferred ranges apply to any one of the embodiments of the invention.

The composition according to embodiments of the invention may also contain, in addition to the coupling agents, coupling activators for the reinforcing filler or more generally processing aids capable, in a known way, by virtue of an improvement in the dispersion of the filler in the rubber matrix and of a lowering of the viscosity of the compositions, of improving their ability to be processed in the raw state.

The rubber compositions in accordance with embodiments of the invention may also comprise all or some of the standard additives customarily used in elastomer compositions intended for the manufacture of tires, such as, for example, pigments, protective agents, such as antiozone waxes, chemical antiozonants or antioxidants, antifatigue agents, reinforcing or plasticizing resins, methylene acceptors (for example, phenolic novolak resin) or methylene donors (for example, HMT or H3M), as described, for example, in application WO 02/10269, vulcanization activators, adhesion promoters, such as cobalt-based compounds, plasticizing agents, preferentially non-aromatic or very slightly aromatic plasticizing agents selected from the group consisting of naphthenic oils, paraffinic oils, MES oils, TDAE oils, ether plasticizers, ester plasticizers, hydrocarbon-based resins exhibiting a high Tg, preferably of greater than 30° C., as described, for example, in applications WO-A1-2005/087859, WO-A1-2006/061064 and WO-A1-2007/017060, and the mixtures of such compounds.

The composition according to embodiments of the invention comprises a chemical crosslinking system which enables the formation of covalent bonds between the elastomer chains. The chemical crosslinking system may be a vulcanization system or a system containing one or more peroxide compounds.

According to a first preferred variant, the crosslinking system is a vulcanization system, that is to say a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), or else known vulcanization retarders, may be added to this basic vulcanization system, being incorporated during the first non-productive phase and/or during the productive phase, as described subsequently.

When sulfur is used, it may be used at a preferential content ranging from 0.5 to 12 phr, in particular from 1 to 10 phr. These preferential ranges apply to any one of the embodiments of the invention. The primary vulcanization accelerator may be used at a preferential content ranging from 0.5 to 10 phr, more preferentially from 0.5 to 5.0 phr. These preferential ranges apply to any one of the embodiments of the invention.

Use may be made, as (primary or secondary) accelerator, of any compound capable of acting as accelerator of the vulcanization of diene elastomers in the presence of sulfur, especially accelerators of the thiazole type and their derivatives, and accelerators of thiuram and zinc dithiocarbamate types. These accelerators are, for example, selected from the group consisting of 2-mercaptobenzothiazole disulfide (abbreviated to MBTS), tetrabenzylthiuram disulfide (TBZTD), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), zinc dibenzyldithiocarbamate (ZBEC) and the mixtures of these compounds.

According to a second variant, when the chemical crosslinking is carried out using one or more peroxide compounds, the content of the peroxide compound(s) may range from 0.01 to 10 phr. Mention may be made, as peroxide compounds of use as chemical crosslinking system, of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di(t-butyl) peroxybenzoate and 1,3-bis(t-butylperoxyisopropyl)benzene, or hydroperoxides, for example t-butyl hydroperoxide. The peroxide compound(s) may be incorporated within the productive phase as described subsequently.

Another subject of embodiments of the invention relates to a process for preparing the rubber composition described above.

The rubber composition according to embodiments of the invention may be manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature ranging from 130° C. to 200° C., preferably ranging from 145° C. to 185° C., followed by a second phase of mechanical working (sometimes referred to as a "productive" phase) at lower temperature, typically below 120° C., for example ranging from 60° C. to 100° C., during which finishing phase the chemical crosslinking system is incorporated.

Generally, all the base constituents of the composition of embodiments of the invention, with the exception of the chemical crosslinking system, namely the reinforcing filler (s), the coupling agent where appropriate, may be intimately incorporated, by kneading, to the modified natural rubber and to the other diene elastomers present where appropriate or to the epoxidized or pre-epoxidized natural rubber in the presence of at least one 1,3-dipolar compound during the first "non-productive" phase, that is to say that at least these various base constituents are introduced into the mixer and thermomechanically kneaded, in one or more steps, until the maximum temperature ranging from 130° C. to 200° C., preferably ranging from 145° C. to 185° C., is reached. This first phase is then followed by a second phase of mechanical working (sometimes referred to as a "productive" phase) at lower temperature, typically below 120° C., for example between 60° C. and 100° C., during which finishing phase the chemical crosslinking system is incorporated.

After incorporation of all the ingredients of the rubber composition, the final composition thus obtained may subsequently be calendered, for example in the form of a sheet or slab, especially for laboratory characterization, or else extruded, to form, for example, a rubber profiled element used as finished or semi-finished product.

According to one embodiment of the invention, the grafting of the 1,3-dipolar compound as defined above to the epoxidized or pre-epoxidized natural rubber may be carried out before, according to the process of embodiments of the invention, the preparation of the rubber composition. Thus, it is the modified natural rubber which is introduced during the first "non-productive" phase.

Thus, according to this embodiment of the process, the latter may comprise at least the following steps:

incorporating at least one reinforcing filler, and especially all the other constituents of the composition when they are present, with the exception of the crosslinking system, into the modified natural rubber, everything being kneaded thermomechanically, once or several times, until a maximum temperature ranging from 130° C. to 200° C., preferably ranging from 145° C. to 185° C., is reached, cooling the combined mixture to a temperature below 100° C., then incorporating at least one chemical crosslinking system, kneading everything up to a maximum temperature of less than 120° C., extruding or calendering the rubber composition thus obtained.

According to another embodiment of the invention, the 1,3-dipolar compound as defined above may be grafted to the epoxidized or pre-epoxidized natural rubber concomitantly to the preparation of the rubber composition. In this case, the epoxidized natural rubber or the pre-epoxidized natural rubber and the 1,3-dipolar compound are introduced during the first, "non-productive" phase. Preferentially, the reinforcing filler and the other diene elastomer, when it is optionally present, are then added subsequently, during this same "non-productive" phase, so as to prevent any side reaction with the 1,3-dipolar compound.

Thus, in this second embodiment of the process, the latter may comprise at least the following steps:

- providing at least one natural rubber and epoxidizing the natural rubber to obtain an epoxidized natural rubber, or providing a pre-epoxidized natural rubber,
- incorporating, to the epoxidized natural rubber or to the pre-epoxidized natural rubber, at least one 1,3-dipolar compound having at least one nitrogen atom, as described above,
- subsequently incorporating at least one reinforcing filler, and optionally all the constituents of the composition, with the exception of the chemical crosslinking system, everything being kneaded thermomechanically, once or several times, until a maximum temperature ranging from 130° C. to 200° C., preferably ranging from 145° C. to 185° C., is reached,
- cooling the combined mixture to a temperature below 100° C.,
- then incorporating at least one chemical crosslinking system,
- kneading everything up to a maximum temperature of less than 120° C.,
- extruding or calendering the rubber composition thus obtained.

In this embodiment, the incorporation of at least one 1,3-dipolar compound to the epoxidized natural rubber or to the pre-epoxidized natural rubber may be carried out at a temperature of greater than or equal to 70° C.

Those skilled in the art will understand that, when the rubber composition comprises at least one other diene elastomer as described above, the rubber composition may preferentially be produced according to the first embodiment of the process, in order to avoid any side reaction between this other diene elastomer and the 1,3-dipolar compound.

Another subject of the invention is a finished or semi-finished rubber product comprising at least one rubber composition according to embodiments of the invention, or capable of being obtained according to one of the processes of embodiments of the invention, more particularly a finished or semi-finished rubber product for a tire. The preferred modes and variants of the rubber composition of embodiments of the invention apply to the finished or semi-finished product. A semi-finished product may for example be a tread.

Another subject of the invention is a tire that comprises at least one semi-finished product as described above.

The abovementioned characteristics of embodiments of the present invention, and also others, will be better understood on reading the following description of several exemplary embodiments of the invention, given by way of illustration and without limitation.

EXEMPLARY EMBODIMENTS

1-. Origin of the Reagents, Preparation of the NRs and Characterizations 1.1 Origins of the Reagents The aqueous hydrogen peroxide (30% by weight in water) and the formic acid (at 95%) are from Aldrich. The polyisoprene NIPOL 2200 is from Nippon Zeon.

1.2. Preparation of the Nitrile Oxides a) Synthesis of 2,4,6-trimethylphenyl-3-(2-(2-ox-oimidazolidin-1-yl)ethoxy)nitrile oxide (compound A)

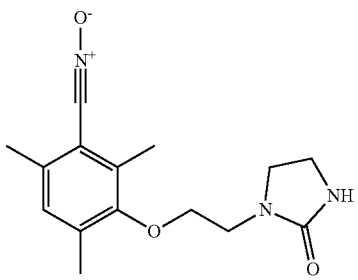

The synthesis of this compound is described in patent FR2962737.

b) Synthesis of N,N,3,5-tetramethyl-4-[(oxido-λ5-azanylidyne) methyl]aniline (compound B)

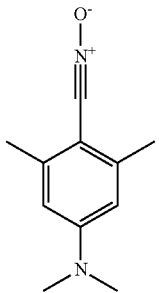

The synthesis of compound B is described in the paper in J. Org. Chem., 1967, 32 (7), pp 2308-2312.

1.3 Preparation of the Natural Rubbers

A deproteinized natural rubber (deproteinized NR) and a plasticized natural rubber (plasticized NR) are used for comparative purposes.

The deproteinized NR rubber is derived from a natural rubber latex which has undergone five successive centrifugations then drying at 65° C. under partial vacuum and flushing with nitrogen for 48 hours.

The plasticized NR rubber is prepared according to conventional methods described in the following patent applications: FR1377363, FR2391225, KR2009033559, JP200241407.

The natural rubber is epoxidized according to the following procedure to obtain natural rubbers that are epoxidized to 25+/2 mol % (ENR 25 mol % (ENR 25)):

The first step consists in devolatilizing the ammonia from a "HA" natural rubber latex. For this purpose, the latex containing 60% by weight of polyisoprene is left with moderate stirring for 24 hours (until the pH is neutralized) in the presence of 3 phr of non-ionic surfactant in order to stabilize it. Once this step has been carried out, pure formic acid ([HCOOH]/[polyisoprene units]=0.3) is added dropwise (over at least 15 minutes). The reaction medium is then heated to 53° C. before adding aqueous hydrogen peroxide ($H_2O_2$ at 30% by weight). The amount of $H_2O_2$ added is dependent on the targeted degree of epoxidation (see table 1). After 24 hours of stirring at 53° C., the chemical reaction is stopped by cooling to ambient temperature then by neutralizing using sodium hydroxide (1.3 equivalents). The latex is then destabilized by adding steam (stripping) for 30 minutes, then creped, washed in water and dried for 48 h at 65° C. under partial vacuum and with nitrogen flushing.

TABLE 1

| Targeted mol % of epoxy | ([H$_2$O$_2$]/ [polyisoprene units] | mol % of epoxy (NMR) |
|---|---|---|
| 25 | 0.3 | 27 |

The molar percentage of epoxy rings obtained at the end of the treatment is determined by NMR according to the method described below.

1.4 Measurements and Tests Used

The elastomers and rubber compositions are characterized, before and after curing, as indicated below.

1.4.1—Determining the Epoxide Content

The epoxide content is determined by NMR analysis. The spectra are acquired on a BRUKER Avance 500 MHz spectrometer equipped with a BBI z-grad 5 mm "broad band" probe for the soluble samples and on a BRUKER Avance 500 MHz spectrometer equipped with an HRMAS 4 mm $^1$H/$^{13}$C probe for the insoluble samples. The quantitative $^1$H NMR experiment uses a simple 30° pulse sequence and a repetition time of 5 seconds between each acquisition. 256 accumulations are carried out. The samples (approximately 25 mg) are dissolved in deuterated chloroform (approximately 1 ml).

The presence of signals at around 2.6 and 1.2 ppm, attributed to epoxy units, are observed on the $^1$H NMR spectra from these samples.

2.6 ppm: —CH group no. 4.
1.2 ppm: —CH$_3$ group no. 3.

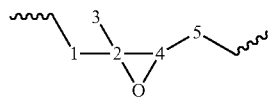

1.4.2—Determining the Content of 1,3-Dipolar Compound Grafted to the Rubbers Tested The content of 1,3-dipolar compound grafted to the chain of the natural rubber or to the chain of the synthetic polyisoprene is determined by NMR analysis. The spectra are acquired on a BRUKER Avance 500 MHz spectrometer equipped with a BBI z-grad 5 mm "broad band" probe for the soluble samples and on a BRUKER Avance 500 MHz spectrometer equipped with an HRMAS 4 mm $^1$H/$^{13}$C probe for the insoluble samples. The quantitative $^1$H NMR experiment uses a simple 30° pulse sequence and a repetition time of 5 seconds between each acquisition. 256 accumulations are carried out. The samples (approximately 25 mg) are dissolved in deuterated chloroform (approximately 1 ml), with washing of same to remove excess unreacted 1,3-dipolar compound.

Characterization of the ENR Modified by the Compound A

The $^1$H NMR spectrum makes it possible to quantify the grafted nitrile oxide units by integration of the signals characteristic of the CH$_2$N and CH$_2$O protons, which appear at a chemical shift of between 3.1 and 3.8 ppm. The 2D HSQC $^1$H-$^{13}$C NMR spectrum makes it possible to confirm the nature of the grafted unit by virtue of the chemical shifts of the carbon atoms and protons.

Characterization of the ENR Modified by the Compound B

The $^1$H NMR spectrum makes it possible to quantify the grafted nitrile oxide units by integration of the signals characteristic of the CH$_3$N protons, which appear at a chemical shift of between 3.1 and 3.3 ppm. The 2D HSQC$^1$H-$^{13}$C NMR spectrum makes it possible to confirm the nature of the grafted unit by virtue of the chemical shifts of the carbon atoms and protons.

2.—Examples of Preparation of Modified Natural Rubbers 2.1 Process for Modifying Natural Rubber In all the cases, the 1,3-dipolar compound to be tested (see table 2) is incorporated, on an open mill (external mixer at 30° C.), to 30 g of natural rubber to be tested or of synthetic polyisoprene (see table 2). The mixture is homogenized in 15 turnover passes. This mixing phase is followed by a heat treatment at 120° C. under a press at a pressure of 10 bar for 30 min.

The percentage of epoxy rings before and after carrying out the modification process is determined by NMR according to the method indicated above.

The molar percentage of 1,3-dipolar compound which has been grafted at the end of the process to the natural rubbers to be tested and to the synthetic polyisoprene is determined by NMR according to the method described above.

The grafting yield corresponds to the content, as molar percentage, of 1,3-dipolar compound grafted to the chain of the natural rubber or of the synthetic polyisoprene, relative to the content, in molar percentage, of 1,3-dipolar compound introduced as starting reagent.

The results obtained are presented in table 2 below.

TABLE 2

| Rubber to be tested | 1,3-Dipolar compound used | mol % of epoxy before reaction (NMR) | mol % of 1,3-dipolar compound introduced | mol % of epoxy after reaction (NMR) | mol % of 1,3-dipolar compound grafted | Grafting yield |
|---|---|---|---|---|---|---|
| Synthetic polyisoprene (NIPOL 2200)* | Compound A | (—) | 1 | (—) | (0.92) | 92 |
| Plasticized NR* | Compound A | (—) | 1 | (—) | (0.13) | 13 |
| Deproteinized NR* | Compound A | (—) | 1 | (—) | (0.56) | 56 |

TABLE 2-continued

| Rubber to be tested | 1,3-Dipolar compound used | mol % of epoxy before reaction (NMR) | mol % of 1,3-dipolar compound introduced | mol % of epoxy after reaction (NMR) | mol % of 1,3-dipolar compound grafted | Grafting yield |
|---|---|---|---|---|---|---|
| Deproteinized NR* | Compound A | (—) | 0.2 | (—) | 0.06 | 30 |
| ENR 25** | Compound A | 27 | 0.5 | 27 | 0.35 | 70 |
| Plasticized NR* | Compound B | (—) | 0.2 | (—) | 0.04 | 20 |
| ENR 25** | Compound B | 27 | 0.2 | 27 | 0.14 | 70 |

*outside the invention
**according to the invention

The grafting yield of a 1,3-dipolar compound to a synthetic polyisoprene (NIPOL 2200) is greater than 90%.

The grafting yield of a 1,3-dipolar compound to a natural rubber, whether deproteinized or plasticized, is low and at most equal to 56%.

On the other hand, astonishingly, when the natural rubber is epoxidized, a grafting yield of greater than 60% is observed. In addition, it is observed that the molar percentage of epoxidized cis-1,4-isoprene units before and after grafting has not been modified, indicating that the epoxy ring is not modified during the grafting reaction.

The grafting yield is not affected by the nature of the chemical group borne by the 1,3-dipolar compound. Indeed, the grafting yield is identical for the compound A and for the compound B.

The invention claimed is:

1. A process for modifying a natural rubber, comprising at least the following steps:
   i. providing at least one natural rubber and epoxidizing said natural rubber to obtain an epoxidized natural rubber, or providing a pre-epoxidized natural rubber,
   ii. grafting, to said epoxidized natural rubber or to said pre-epoxidized natural rubber, at least one 1,3-dipolar compound having at least one nitrogen atom.

2. A process according to claim 1, wherein said epoxidized natural rubber or said pre-epoxidized natural rubber has a degree of epoxidation of less than or equal to 50 mol %.

3. A process according to claim 1, wherein the step (ii) is carried out in bulk or in solution.

4. A process according to claim 1, wherein the 1,3-dipolar compound comprises at least one nitrile oxide, nitrilimine or nitrone dipole.

5. A process according to claim 4, wherein the 1,3-dipolar compound comprises at least one nitrile oxide dipole.

6. A process according to claim 5, wherein the nitrile oxide dipole belongs to a unit corresponding to the general formula (I)

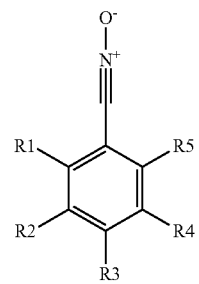

(I)

in which:
R1, R2, R3, R4, R5, which are identical or different, represent a hydrogen atom, a halogen atom, a $C_1$-$C_5$ alkyl, a $C_1$-$C_5$ alkoxyl or a covalent bond enabling attachment to the remainder of the 1,3-dipolar compound;
with the proviso that at least one of R1, R2, R3, R4, R5 represents said covalent bond.

7. A process according to claim 1, wherein the step (ii) is carried out by heating to a temperature of greater than or equal to 70° C.

8. A process according to claim 1, wherein the content of said 1,3-dipolar compound ranges from 0.1 to 10 mol %.

9. A process according to claim 1, wherein the 1,3-dipolar compound bears at least one chemical group intended to be grafted to the epoxidized natural rubber, said chemical group being a hydrocarbon-based chain that may optionally contain a heteroatom.

10. A process according to claim 9, wherein the chemical group is selected from hydrocarbon-based groups, optionally substituted nitrogenous or sulfur-containing heterocycles, esters, phosphates, dialkylaminos and associative groups comprising at least one nitrogen atom.

11. A process according to claim 10, wherein the associative group comprising at least one nitrogen atom is selected from the following formulae (IV), (V), (VI), (VII) and (VIII):

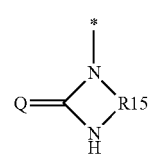

(IV)

-continued

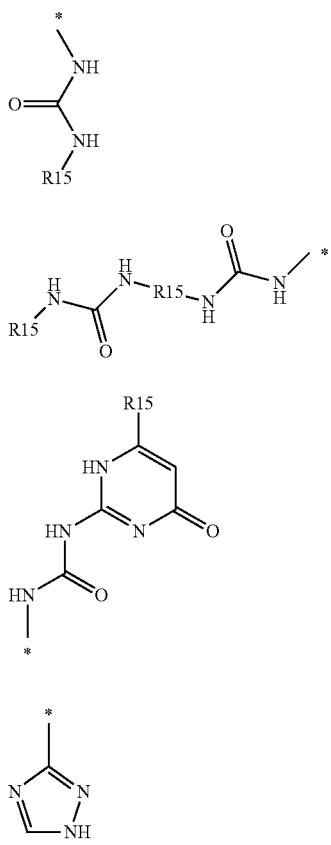

(V)

(VI)

(VII)

(VIII)

in which:
R15 represents a hydrocarbon-based group that may optionally contain heteroatoms,
Q represents an oxygen or sulfur atom or NH,
the symbol * represents an indirect attachment to the dipole of the 1,3-dipolar compound.

12. A process according to claim 10, wherein the 1,3-dipolar compound is selected from the compounds corresponding to the formulae (IX), (X), (XI), (XII), (XIII), (XIV), (XV), (XVI), (XVII), (XVIII), (XIX) and their mesomeric forms:

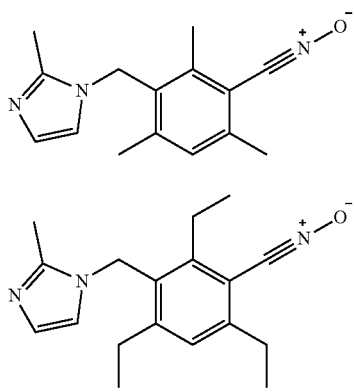

(IX)

(X)

-continued

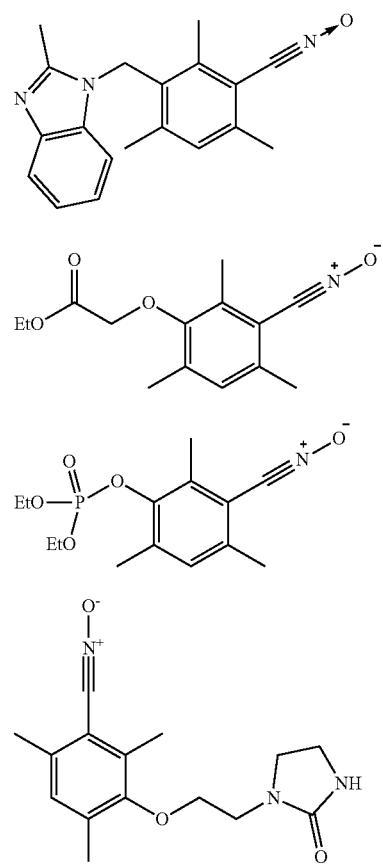

(XI)

(XII)

(XIII)

(XIV)

(XV)

(XVI)

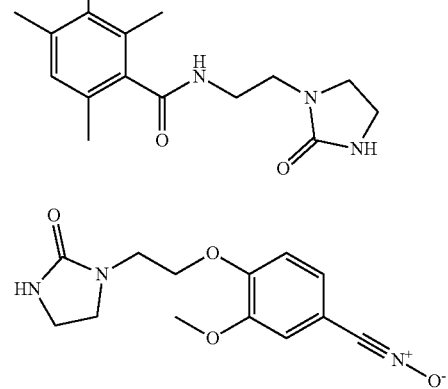

(XVII)

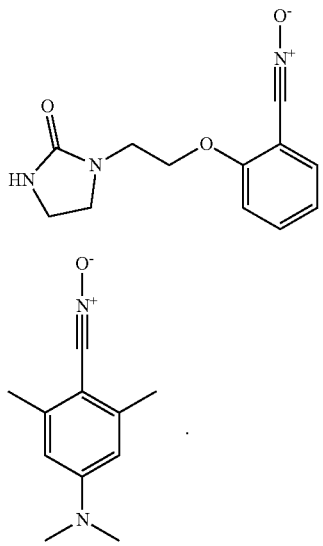

13. A process according to claim 1, wherein said epoxidized natural rubber or said pre-epoxidized natural rubber has a degree of epoxidation of greater than or equal to 0.5 mol %.

14. A process according to claim 1, wherein the step (ii) is carried out in bulk.

15. A modified natural rubber obtained according to the process defined in claim 1.

16. A rubber composition based on:
at least one modified natural rubber according to claim 15,
at least one reinforcing filler, and
at least one crosslinking system.

17. A process for producing a composition according to claim 16, the process comprising at least the following steps:
incorporating at least one reinforcing filler into the modified natural rubber, everything being kneaded thermomechanically, once or several times, until a maximum temperature ranging from 130° C. to 200° C., is reached,
cooling the combined mixture to a temperature below 100° C.,
then incorporating at least one chemical crosslinking system,
kneading everything up to a maximum temperature of less than 120° C.,
extruding or calendering the rubber composition thus obtained.

18. A process for producing a composition according to claim 16, the process comprising at least the following steps:
providing at least one natural rubber and epoxidizing said natural rubber to obtain an epoxidized natural rubber, or providing a pre-epoxidized natural rubber,
incorporating at least one 1,3-dipolar compound having at least one nitrogen atom to the epoxidized natural rubber from the preceding step,
subsequently incorporating at least one reinforcing filler, everything being kneaded thermomechanically, once or several times, until a maximum temperature ranging from 130° C. to 200° C., is reached,
cooling the combined mixture to a temperature below 100° C.,
then incorporating at least one chemical crosslinking system,
kneading everything up to a maximum temperature of less than 120° C.,
extruding or calendering the rubber composition thus obtained.

19. A finished or semi-finished rubber product comprising at least one rubber composition defined according to claim 16.

20. A tire comprising at least one semi-finished product defined according to claim 19.

* * * * *